May 24, 1960  R. S. QUANDT  2,937,794
POURING VESSEL
Filed June 12, 1956

INVENTOR.
ROBERT S. QUANDT
BY Clarence R. Patty, Jr.
ATTORNEY

United States Patent Office 2,937,794
Patented May 24, 1960

2,937,794
POURING VESSEL

Robert S. Quandt, Levittown, Pa., assignor to Corning Glass Works, Corning, N.Y., a corporation of New York Filed June 12, 1956, Ser. No. 590,895

4 Claims. (Cl. 222—473)

The present invention relates particularly to glass vessel assemblies from which light viscosity liquid, such as water, aqueous beverages, etc., are to be poured, and is concerned primarily with vessel lid means for control of the liquid in its flowing movement out of the vessel mouth. The kinds of vessels to which my invention is applicable are many, pitchers, bowls, and decanters, just to mention a few. In the ensuing description the term "decanter" will be used as a designation for all such vessels.

More particularly, the control means of this invention comprises a concave-convex lid adapted to be resiliently held in light engagement with the upwardly and outwardly flared wall surface of the decanter with the convex surface of the lid depending into the decanter mouth. Such lid is conveniently provided with an integral strap whose free end is folded and wedged between the decanter wall and its handle to anchor the lid to the decanter. Also an intermediate portion of such strap is given the form of an inverted U in the region bridging the decanter wall and functions as a leaf spring to resiliently hinge the lid into light engagement with the decanter.

For a better understanding of the invention reference is made to the accompanying drawing in which.

Figure 1:
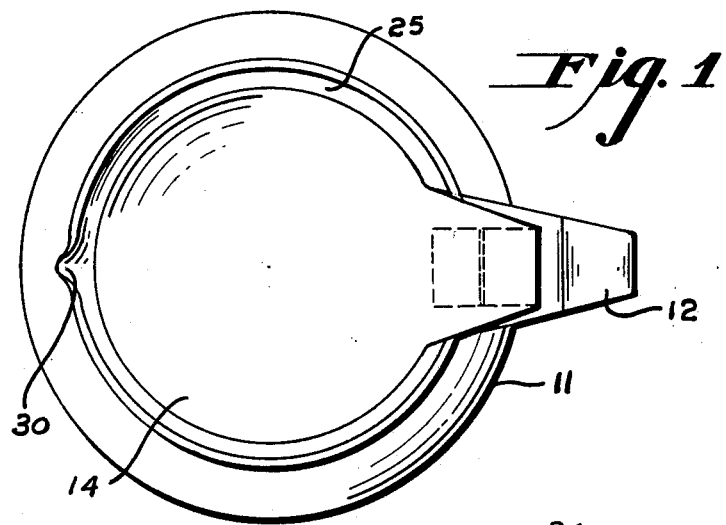
Fig. 1 is a top plan view of a decanter assembly embodying the invention.
Figure 2:
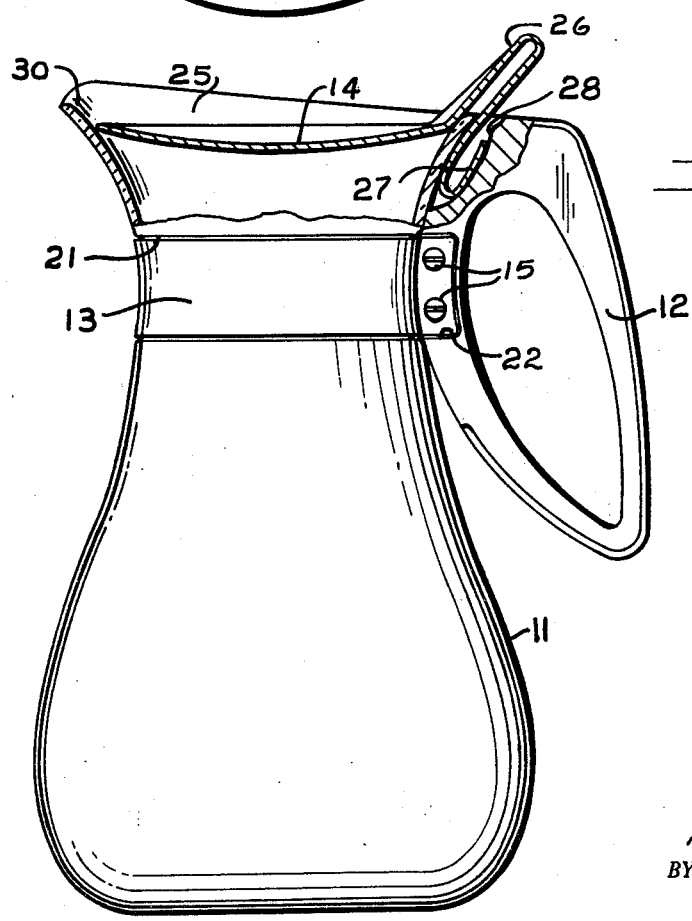
Fig. 2 is a side elevational view of the decanter assembly, shown partly in section.

Referring to the drawing in detail, the assembly comprises a decanter 11, a handle 12, a handle holding band 13, a lid 14, and clamping bolts 15 respectively.

The decanter 11 is provided with a shallow groove 21 about its neck region for receipt of the band 13 thereabout. Band 13 at its free ends is formed to receive a suitably recessed portion 22 of the handle therebetween. The band 13 is clamped to the decanter and to the handle by means of the bolts 15 which pass through suitably aligned apertures in the handle and band.

The outline and contour of that portion of the handle adjacent the decanter matches that of the decanter so that with the clamping bolts 15 in place the handle becomes rigidly held against the decanter wall.

As is readily apparent from the drawing, the periphery of the lid 14 is nicely seated on the upwardly and outwardly flared decanter mouth wall surface 25. The lid is resiliently so held by the inverted U portion of the lid strap portion 26 whose folded over end 27 occupies a pocket between the decanter wall and the handle 12 as provided by means of a recess 28 formed in the handle. As will be understood the folded over end 27 of the lid strap is slightly compressed during its placement in the pocket and when anchored therein tends to slightly separate the bifurcations of the lid strap portion 26 to lightly hold the lid in the position shown. As will be evident, anchoring of the lid to the assembly in the foregoing fashion renders the lid readily removable for cleaning purposes. As will be observed from the drawing, the lid, which is generally circular, engages the flared wall surface portion 25 of the decanter at the level of the lower region of the pouring lip 30, thus normally effectively closing the decanter mouth. Since the lid has its convex side down it is available for engagement over a large surface area by liquid as the decanter is tilted to effect pouring; and owing to the light pressure applied to the lid, it is readily displaced by the liquid to permit its free flow from the decanter over the decanter lip.

What is claimed is:

1. In combination, a handled vessel having a mouth in the upper end thereof and a pocket having three sides formed by the handle bordering a top entrance thereinto and having a fourth side wall formed by the vessel, a single piece lid for said vessel mouth, said lid having a vessel mouth covering portion, an anchoring portion occupying such pocket in resilient engagement with the oppositely disposed walls thereof and a strap portion uniting said mouth covering and anchoring portions respectively, resiliently yieldable to pressure on the bottom of said lid by liquid within the vessel when the same is tilted to a pouring position.

2. As an article of manufacture, a handle adapted to be rigidly attached to a mouthed vessel by a band surrounding the vessel and anchored to the handle, said handle having a recessed vessel facing portion cooperative with the vessel to which it is attached to form a lid anchoring pocket closed on all surrounding sides and a lid for said vessel having a cover portion for arrangement over the vessel mouth, an anchoring portion occupying such pocket and in resilient engagement with the oppositely disposed walls thereof and a strap portion extending over the vessel wall into union with the cover portion, resiliently yieldable to pressure on the bottom of said lid by liquid within the vessel when the same is tilted to a pouring position.

3. For use with a handled decanter having an upwardly and outwardly extending mouth bordering surface, a lid, a strap integral with a bordering portion of the lid and having its free end portion folded to adapt it for being resiliently anchored in a space between a wall of the decanter and an oppositely disposed wall surface of the handle, said strap having a folded portion intermediate the lid and the anchoring portion tensioned to resiliently urge the peripheral portion of the lid in engagement with such upwardly and outwardly mouth bordering surface of the decanter, and which is resiliently yieldable to pressure on the bottom of said lid by liquid within the vessel when the same is tilted to a pouring position.

4. In combination, a mouthed vessel whose surrounding side wall flares outwardly at its upper end and forms the boundary of its mouth, a handle having a surface mated to the upper end portion of the vessel side wall, a band encircling the vessel having said handle clamped between its ends, means comprising an upper end portion of said handle and an oppositely disposed portion of the vessel side wall forming a pocket adjacent such side wall having its cavity wholly surrounded by said handle and vessel therein having a top entrance only, and a single piece resiliently yieldable lid arranged on the interior surface of the flared portion of such side wall, said lid having a generally U-shaped portion bridging said side wall and having an adjoining folded anchoring portion slidable into and out of said pocket and when therein resiliently engaging the vessel side-wall and a wall of said pocket respectively, said U-shaped portion being resiliently yieldable to pressure on the bottom of said lid by liquid within the vessel when the same is tilted to a pouring position.

References Cited in the file of this patent
UNITED STATES PATENTS

| | | |
|---|---|---|
| 958,312 | Reynolds | May 17, 1910 |
| 1,083,153 | Strodel | Dec. 30, 1913 |

(Other references on following page)

UNITED STATES PATENTS

| | | |
|---|---|---|
| 1,166,209 | Hoffman | Dec. 28, 1915 |
| 1,763,125 | Baron | June 10, 1930 |
| 2,120,699 | Gamble | June 14, 1938 |
| 2,193,232 | Hacmac | Mar. 12, 1940 |
| 2,281,380 | Peterson | Apr. 28, 1942 |
| 2,312,584 | Peterson | Mar. 2, 1943 |
| 2,380,906 | Gessler | July 31, 1945 |
| 2,424,125 | Sieling | July 15, 1947 |
| 2,432,323 | MacManus | Dec. 9, 1947 |
| 2,573,378 | Zurlinden | Oct. 30, 1951 |
| 2,805,561 | Emmert et al. | Sept. 10, 1957 |